(12) United States Patent
Runeson

(10) Patent No.: US 8,958,284 B2
(45) Date of Patent: Feb. 17, 2015

(54) PORT NUMBER RESERVATION AGENT

(75) Inventor: Stefan Runeson, Lund (SE)

(73) Assignee: ST-Ericsson SA, Plan-les-Ouates (CH)

( * ) Notice: Subject to any disclaimer, the term of this patent is extended or adjusted under 35 U.S.C. 154(b) by 536 days.

(21) Appl. No.: 13/279,378

(22) Filed: Oct. 24, 2011

(65) Prior Publication Data

US 2012/0320738 A1 Dec. 20, 2012

Related U.S. Application Data

(60) Provisional application No. 61/497,554, filed on Jun. 16, 2011.

(51) Int. Cl.
*H04L 29/06* (2006.01)
*H04L 29/12* (2006.01)
*H04W 4/00* (2009.01)

(52) U.S. Cl.
CPC .......... *H04L 69/162* (2013.01); *H04L 61/6086* (2013.01); *H04L 61/6063* (2013.01); *H04W 4/003* (2013.01); *H04L 61/2007* (2013.01)
USPC ....................................... 370/221

(58) Field of Classification Search
USPC ....................................... 370/221
See application file for complete search history.

(56) References Cited

U.S. PATENT DOCUMENTS

| | | | |
|---|---|---|---|
| 5,636,371 A | 6/1997 | Yu | |
| 5,913,024 A | 6/1999 | Green et al. | |
| 6,061,349 A | 5/2000 | Coile et al. | |
| 6,363,081 B1 | 3/2002 | Gase | |
| 6,549,538 B1 | 4/2003 | Beck et al. | |
| 7,673,074 B1 | 3/2010 | Sebastian et al. | |
| 7,685,322 B2 | 3/2010 | Bhesania et al. | |
| 8,429,304 B2 * | 4/2013 | Shima et al. | 709/250 |
| 2003/0158906 A1 * | 8/2003 | Hayes | 709/211 |
| 2005/0114469 A1 * | 5/2005 | Nakamura et al. | 709/218 |
| 2006/0133343 A1 * | 6/2006 | Huang | 370/349 |
| 2007/0002822 A1 * | 1/2007 | Huang | 370/349 |
| 2007/0076625 A1 * | 4/2007 | Tahara et al. | 370/252 |

* cited by examiner

*Primary Examiner* — Dang Ton
*Assistant Examiner* — Robert M Morlan
(74) *Attorney, Agent, or Firm* — Coats & Bennett, PLLC

(57) ABSTRACT

In a communication device having a modem subsystem and an Application Processing Engine (APE) that share an IP address, port number conflicts are avoided by a Port Reservation Agent (PRA) running on the APE. Apps executing on the modem subsystem must request to register a port number with the PRA prior to using it. If the address is available, the PRA creates a port reservation socket and associates the port number with the requesting app. If the requested port number is not available, the PRA returns an error and the app must request a different address. To apps executing on the APE, the port reservation sockets appear as port numbers associated with other apps executing on the APE. In this manner, port number conflicts between the modem subsystem and the APE are avoided.

9 Claims, 3 Drawing Sheets

PORT NUMBER RESERVATION AGENT

PRIORITY CLAIM

The present application claims priority to U.S. Application Ser. No. 61/497,554, titled "Port Number Reservation Agent", filed with the United States Patent Office on Jun. 16, 2011, the disclosure of which is incorporated herein by reference in its entirety.

FIELD OF THE INVENTION

The present invention relates generally to wireless communication devices, and in particular to a system and method of reserving port number to prevent port number conflict between a modem subsystem and application processor in a wireless device.

BACKGROUND

Wireless communication devices—such as cellphones and smartphones—are enormously popular and represent a significant consumer electronics market. Increasingly, such devices are structured as an Application Processing Engine (APE) executing IP-based applications (commonly known as "apps"). The wireless device additionally includes a modem subsystem, including a transceiver, which implements the wireless data link between the device and a subscriber network, and which also executes apps.

FIG. 1 depicts this basic functional division of a wireless device 10 into a modem subsystem 12, and an APE 14. The modem subsystem 12 includes a transceiver 16 operative to exchange data with a network via one or more antennas 17, a packet inspection function 18, and an IP stack 20. The modem subsystem 12 may execute apps 22, reserving port numbers in the modem subsystem IP stack 20. The APE 14 additionally executes apps 22, reserving port numbers in an APE IP stack 24. The wireless device 10 thus maintains two different IP stacks 20, 24, but in many cases, it is assigned only one IP address. The single IP address must be shared between both IP stacks 20, 24.

To account for this, the packet inspection function 18 of the modem subsystem 12 inspects the IP addresses of all incoming packets received by the transceiver 16. The packet inspection function 18 forwards incoming packets to either the modem subsystem IP stack 20 or the APE IP stack 24, depending on the port number of each incoming packet. In particular, the packet inspection function 18 forwards incoming packets having a port number used by the modem IP stack 20 to the modem IP stack 20, and forwards all other packets to the APE IP stack 24. This works well if the modem subsystem IP stack 20 and APE IP stack 24 maintain mutually exclusive port numbers.

However, in the case that an app executing on the modem subsystem 12 registers a port number on the modem subsystem IP stack 20, and the address was previously registered by an app executing on the APE 14, a conflict arises. Future incoming IP packets addressed to the conflicting port number will be routed by the packet inspection function 18 to the modem subsystem IP stack 20. The APE IP stack 24 will simply stop receiving packets, with no warning or error message. Additionally, the packets intended for the APE app 22 may make no sense to, or cause erratic behavior of, the modem subsystem app 22.

SUMMARY

In order to prevent a port number from being utilized on both the modem subsystem and the APE, a Port Reservation Agent (PRA) is introduced on the APE. The PRA reserves server and client ports on the APE by creating port reservation sockets in the APE IP stack, on behalf of apps executing on the modem subsystem. This ensures that apps executing on the modem subsystem do not register ports using addresses already in use by apps executing on the APE. If an app executing on the modem subsystem attempts to use such a port number, it will receive an error message from the PRA, and it must select an alternative port number. Similarly, if an app executing on the APE attempts to register a port number already in use by an app executing on the modem subsystem, it will see an apparent conflict with the port reservation socket, and must select and register a different port number. Since this process is a standard procedure, apps on the APE (often created by third-party developers) need not be aware of the PRA or the port number conflict avoidance system it implements.

One embodiment relates to a communication device. The device includes a modem subsystem operative to send and receive data packets to and from at least one external device, and further operative to manage a first IP stack and to execute at least one app, the app being operative to exchange data with an external device via a port number. The device also includes an APE operative to manage a second IP stack and to execute at least one app operative to exchange data with an external device via a port number. The device further includes a Port Reservation Agent (PRA) on the APE, the PRA operative to receive from the modem subsystem a request for a port number and if the port number is available, create a port reservation socket on the APE and connect the port reservation socket to the requested port number, and if the port is not available, return an error message to the modem subsystem.

Another embodiment relates to a method, by a modem subsystem of a communication device that also includes an APE, wherein the modem subsystem and the APE share an IP address, of executing an app operative to exchange data with an external device via a port number. A port number is selected for the app. A request to register the port number with a Port Reservation Agent (PRA) on the APE is issued. If the port number is free in the PRA, data is exchanged with an external device via the port number. If the port number is not free, the method is repeated with a new port number.

Yet another embodiment relates to a method, by an APE of a communication device that also includes a modem subsystem, wherein the APE and the modem subsystem share an IP address, of avoiding port number conflicts by apps executing on the modem subsystem. A list of port numbers and their associated apps executing on the APE is maintained. A request for a port number is received from an app executing on the modem subsystem. If the requested port number is free, an entry is created for the port number and it is associated with the requesting app. If the requested port number is not free, an error message is returned. Port number conflicts between apps executing on the modem subsystem and apps executing on the APE are thus avoided.

DETAILED DESCRIPTION

Figure 1:
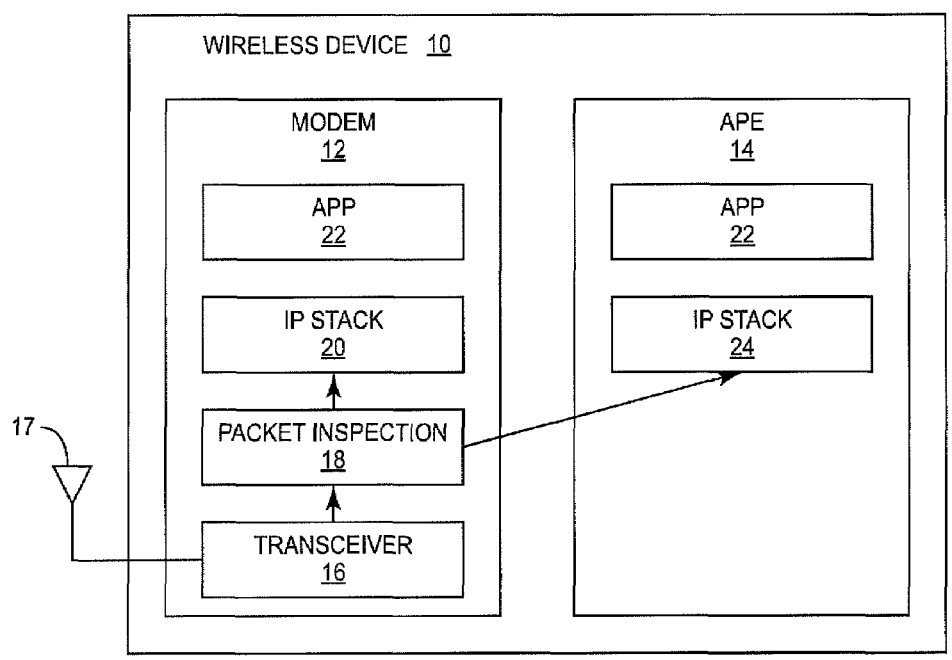
FIG. 1 is a functional block diagram of a prior art modem subsystem and APE, depicting incoming packet inspection and routing by the modem.
Figure 2:
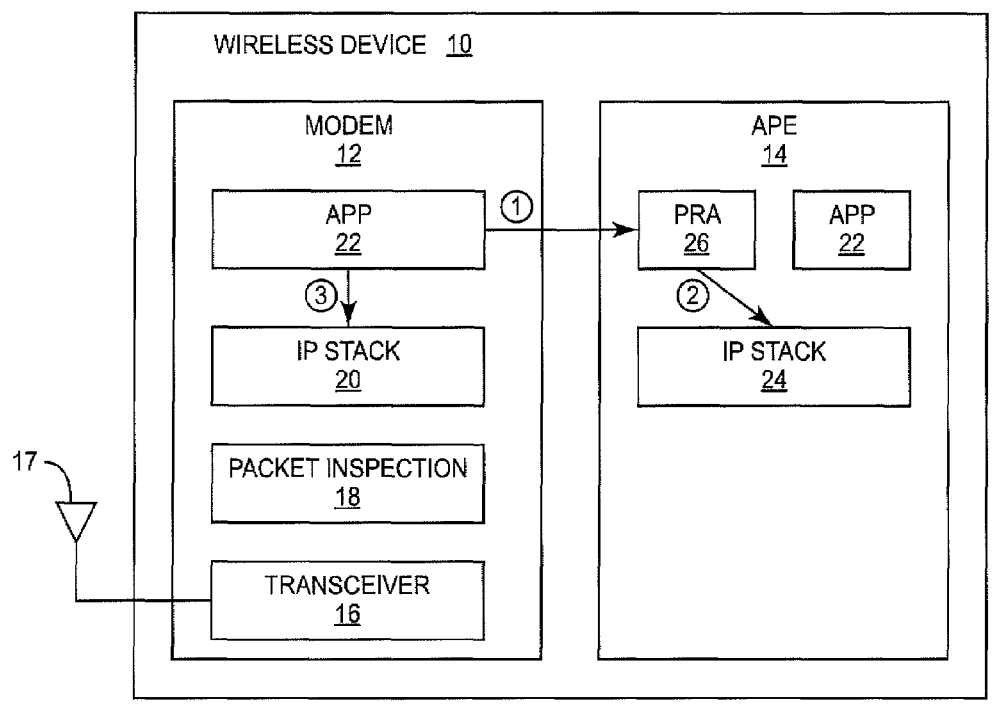
FIG. 2 is a functional block diagram of a modem subsystem and APE, a Port Reservation Agent (PRA) on the APE, which avoids IP address conflicts.

FIG. 2 depicts a wireless communication device 10 having a modem subsystem 12 with an IP stack 20 and an APE 14 with an IP stack 24, each executing apps 22, as described above. The APE 14 additionally includes a Port Reservation Agent (PRA) 26. The PRA 26 is operative to avoid port number conflicts between the modem subsystem IP stack 20 and APE IP stack 24 by forcing modem subsystem apps 20 to register with the PRA 26, as described more fully herein.

Port Reservation Agent

The PRA 26 is preferably a software application running on the APE 14, but may alternatively be implemented in hardware or firmware. The PRA 26 interacts with other software through an Application Programming Interface (API), which may be different for different programming languages and operating systems. In one embodiment, the PRA 26 exposes the following APIs elements to the modem subsystem:

int reserve_serverport(unsigned short port);
    int release_serverport(unsigned short port);
    int reserve_clientport(unsigned short port);
    int release_clientport(unsigned short port);

The PRA 26 reserves a server port by creating a port reservation socket and binding the server port to the port reservation socket. The PRA 26 will never receive any packets on the port reservation socket—also known as a "dummy socket"—because the packet inspection function 18 on the modem subsystem 12 will forward all incoming packets addressed to this port to the modem subsystem IP stack 20. However, registration of the port reservation socket with the PRA 26 prevents apps 22 executing on the modem subsystem 12 from registering, with the modem subsystem IP stack 20, any port number already used by an apps 22 executing on the APE 14, and hence subsequently diverting that app's packet stream to the modem subsystem 12.

The PRA 26 reserves a client port by creating a port reservation socket and connecting the client port to the port reservation socket. Only an app 22 running on the modem subsystem 12 will send data using that client port.

The PRA 26 releases a server or client port reserved by an app 22 on the modem subsystem 12 by closing the corresponding port reservation socket.

App on Modem Subsystem

Figure 3:
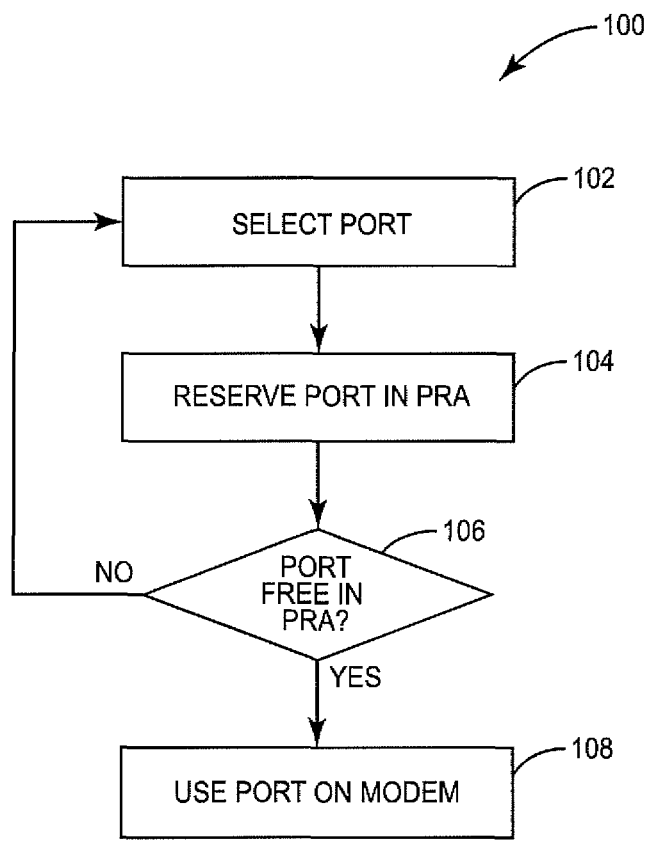
FIG. 3 is a flow diagram of a method of reserving a port number for an app on a modem subsystem.

FIG. 2 diagrams, and FIG. 3 describes, a method 100 for an app 22 executing on the modem subsystem 12 to select and use a port number. When an app 22 executing on the modem subsystem 12 selects a port number it would like to use (block 102 of FIG. 3), it must first reserve the port number via the PRA 26, e.g., using the function reserve_serverport( ) or reserve_clientport( ) in the PRA API, depending on whether it is a server or client port (arrow 1 in FIG. 2; block 104 in FIG. 3). If the port number is free (block 106 in FIG. 3) and the reservation succeeds, the function reserve_serverport( ) or reserve_clientport( ) will return a positive result, and the PRA 26 reserves the port in the APE IP stack 24, as described above (arrow 2 in FIG. 2). Based on this positive result from the PRA 26, the app 22 executing on the modem subsystem 12 then reserves the port number on the modem subsystem IP stack 20 (arrow 3 in FIG. 2; block 108 in FIG. 3), and continues execution. The app 22 may then exchange packets with the network, and this activity will not divert any packets intended for an app 22 executing on the APE 14.

If the reservation fails—that is, if the function reserve_serverport( ) or reserve_clientport( ) returns a negative result—then an app 22 executing on the APE 14 has already reserved that port number (block 106 in FIG. 3), and the app 22 executing on the modem subsystem 12 must select a new port number (block 102 in FIG. 3) and initiate a new port reservation request (arrow 1 in FIG. 2; block 104 in FIG. 3). In this manner, the port reservations of apps 22 executing on the APE 14 are protected from having their data streams diverted by apps 22 executing on the modem subsystem 12 subsequently using the same port number.

When an app 22 executing on the modem subsystem 12 would like to release the use of a port number, the app 22 must release the port both by the PRA 26, using the function release_serverport( ) or release_clientport( ) in the PRA API (depending on whether it is a server or client port), and also on the modem IP stack 20.

App on APE

If any app 22 executing on the APE 14 attempts to use a port that is used by an app 22 executing on the modem subsystem 12, the app 22 executing on the APE 14 and requesting the port number will encounter a port reservation socket in the APE IP stack 24, and receive an error response. The error is identical to what would occur if the conflicting app 22 executing on the modem subsystem 12 were instead executing on the APE 14. Accordingly, this solution places no requirements on apps 22 executing on the APE 14, so third-party developers may use standard procedures for allocating ports.

Advantages of the Invention

The Port Reservation Agent 26 according to embodiments of the present invention presents numerous advantages over prior art solutions.

First, there is no port conflict between the modem subsystem IP stack 20 and the APE IP stack 24. This is true even though they share the same IP address.

Additionally, if an app 22 executing on the APE 14 attempts use a port that is already used by an app 22 executing on the modem subsystem 12, the app 22 executing on the APE 14 will receive the same error response as if the conflicting app 22 executing on the modem subsystem 12 was instead executing on the APE 14. Accordingly, the app 22 executing on the APE 14 may rely on conventional error-handling for a conflicting port number. This is an important advantage, since the apps 22 executing on the APE 14 are often developed by third-party developers.

Both the modem subsystem 12 and the APE 14 may be implemented in dedicated hardware, programmable hardware with appropriate firmware, as appropriately programmed processors (microprocessor, digital signal processor, or the like), or any combination thereof. The inventive PRA 26 may be implemented as a software module executing on the APE 14, as part of the APE IP stack 24, as part of an operating system, or as a stand-alone app 22. As such, software implementing the PRA 26 may be stored in memory on or accessible to the APE 14, or on any computer-readable media, such as memory (e.g., RAM, ROM, Flash, or the like), magnetic or optical media, hard disk drive, or the like. The PRA 26 software may be loaded onto the APE 14 at manufacture, during a configuration process, or at any time via the modem subsystem 12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A communication device, comprising:
  a modem subsystem operative to send and receive data packets to and from at least one external device, and further operative to manage a first IP stack and to execute at least one software application program (app), the app being operative to exchange data with an external device via a port number;
  an Application Processing Engine (APE) operative to manage a second IP stack and to execute at least one app operative to exchange data with an external device via a port number; and
  a Port Reservation Agent (PRA) on the APE, the PRA operative to receive from the modem subsystem a request for a port number and if the port number is available, create a port reservation socket on the APE and connect the port reservation socket to the requested port number, and if the port is not available, return an error message to the modem subsystem.

2. The device of claim 1 wherein the first and second IP stacks share the same IP address.

3. The device of claim 1 wherein connecting a port reservation socket to a port number on the APE comprises registering the port number with the second IP stack.

4. The device of claim 1 wherein the modem subsystem is further operative to direct received data having a port number associated with an app executing on the modem subsystem, to the app executing on the modem subsystem.

5. The device of claim 4 wherein the modem subsystem is further operative to direct received data having a port number not associated with an app executing on the modem subsystem to the second IP stack.

6. The device of claim 1 wherein the PRA is operative to expose the following application programming interfaces to the modem subsystem:
  int reserve_serverport(unsigned short port);
  int release_serverport(unsigned short port);
  int reserve_clientport(unsigned short port); and
  int release_clientport(unsigned short port).

7. A method, by a modem subsystem of a communication device that also includes an Application Processing Engine (APE), wherein the modem subsystem and the APE each maintain separate IP stacks, and both share an IP address, of executing a software application program (app) operative to exchange data with an external device via a port number, comprising:
  selecting a port number for the app;
  requesting to register the port number with a Port Reservation Agent (PRA) executing on the APE, the PRA being operative to reserve the port number on the APE IP stack if the port number is free in the APE IP stack;
  if the port number is free in the PRA, additionally reserving the port number on the modem subsystem IP stack and exchanging data with an external device via the port number by connecting a port reservation socket to the port number on the modem subsystem IP stack and exchanging data with an external device via the port reservation socket; and
  if the port number is not free, avoiding port number conflicts between apps executing on the modem subsystem and apps executing on the APE by repeating the method with a new port number.

8. The method of claim 7 further comprising:
  receiving data from an external device;
  if the data is addressed to a port number associated with an app executing on the modem subsystem, directing the data to the modem subsystem IP stack; and
  if the data is not addressed to a port number associated with an app executing on the modem subsystem, directing the data to the APE IP stack.

9. A method, by an Application Processing Engine (APE) of a communication device that also includes a modem subsystem, wherein the APE and the modem subsystem share an IP address, of avoiding port number conflicts by application software programs (apps) executing on the modem subsystem, comprising:
  maintaining a list of port numbers and their associated apps executing on the APE;
  receiving a request for a port number from an app executing on the modem subsystem;
  if the requested port number is free, creating an entry for the port number and associating it with the requesting app by creating a port reservation socket, and connecting the socket to a client or server port number;
  if the requested port number is not free, returning an error message;
  whereby port number conflicts between apps executing on the modem subsystem and apps executing on the APE are avoided.

* * * * *